Patented July 22, 1941

2,249,793

UNITED STATES PATENT OFFICE 2,249,793

PURIFICATION OF VALUABLE HYDROCARBONS

Frank J. Soday, Upper Darby, Pa., assignor to The United Gas Improvement Company, a corporation of Pennsylvania No Drawing. Application June 23, 1938, Serial No. 215,431

7 Claims. (Cl. 260—674)

This invention pertains generally to the purification of hydrocarbons, and pertains particularly to the purification of resin-forming unsaturated hydrocarbons obtained from (1) gas condensates and tar oils produced in the manufacture of artificial gas; (2) cracked petroleum products; (3) coal tar distillates; and (4) synthetic sources such as processes for the manufacture of synthetic styrene.

The invention pertains more particularly to the purification of crude fractions of resin-forming unsaturated hydrocarbons derived from light oil such as crude styrene, crude indene, crude cyclopentadiene, crude methyl styrenes, crude isobutylene, crude isoprene, butadiene, piperylene and the like.

In the various processes for the manufacture of artificial gas such as oil gas, carburetted water gas, or coal gas, considerable quantities of tar are produced, and the gas contains substantial quantities of other readily condensible materials.

The latter condensates as well as the distillate from the tar are generally known as light oil and are sources for many resin-forming unsaturated hydrocarbons such as indene, styrene, methyl styrene, cyclopentadiene, isobutylene, isoprene, piperylene, butadiene, etc.

Structural formulae for the foregoing materials are as follows:

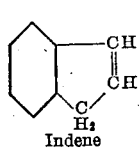 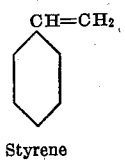 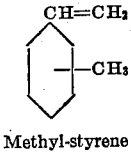
Indene       Styrene       Methyl-styrene

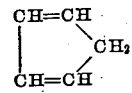    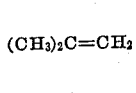    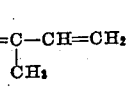
Cyclopentadiene    Isobutylene    Isoprene

      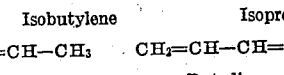
Piperylene      Butadiene

With ordinary methods of fractional distillation as now practiced, it is impossible to separate the resin-forming unsaturated hydrocarbons in a substantially pure state because of the presence of other materials which apparently are either of similar boiling point or are capable of forming azeotropic mixtures with the desired hydrocarbon. Furthermore, many of these materials are polymerizable with heat which adds to distillation difficulties.

For instance a typical styrene fraction obtained by ordinary distillation processes will contain hardly more than 50% styrene, and a typical indene fraction will contain hardly more than 80% indene.

Such fractions as well as those of lower and higher concentration are generally suitable for the manufacture of synthetic resins by polymerization, except that the resulting resins are very often too inferior with respect to color, color stability, electrical resistance, molding properties, freedom from crazing, thermal stability, melting point, specific viscosity, molecular weight and mechanical strength as to be of any considerable value.

I find that these deficiencies are generally traceable to the presence during the polymerization of certain contaminating materials.

It is difficult, if not impossible, to prepare a commercial grade of resin, such as polystyrene, from crude light oil fractions unless at least some of the contaminating impurities are removed.

While the exact influence of these contaminating materials is not known it may be pointed out that they may act (1) as accelerators resulting in the production of polystyrene of relatively poor quality under polymerizing conditions which would normally result in the production of a good grade of polystyrene; (2) as inhibitors reducing the quantity of polystyrene obtained under normal polymerizing conditions; and/or (3) they may take part in the reaction and become an integral part of the resin molecule.

The presence of contaminating impurities in the polymer molecule would undoubtedly weaken it, causing the resin to be less stable to heat and to readily decompose with the formation of undesired color bodies.

The highly reactive nature of the resin-forming unsaturated hydrocarbons makes it extremely difficult to remove the contaminating impurities.

For instance, customary methods for the removal of impurities, such as sulfur compounds, diolefines and acetylenes, from cracked distillates in the manufacture of motor fuels removes most, if not all, of any styrene present.

It seems probable that any material which is sufficiently reactive to be capable of use for the purification of the crude resin-forming unsaturated hydrocarbons will react with them.

I have found that these unsaturated hydrocarbons, or solutions containing these unsaturated hydrocarbons, may be refined by treating them with organic or inorganic alkalies, either in the undiluted solid or liquid form, or in the form of solutions in solvents.

I have found that alcoholic solutions of sodium hydroxide are especially well suited for this purpose, the alcohol serving as a mutual solvent for the alkali and the unsaturated hydrocarbon or the unsaturated hydrocarbon solution.

Stratification and removal of alkali, alkali residues and alcohol is then obtained by adding a stratifying agent such as water, or the alkali and alkali residues may be removed by other means such as by an adsorbent material and the alcohol by distillation. Generally speaking, however, the presence of alcohol in the hydrocarbon is not detrimental to the polymerization of the hydrocarbon.

The following example will serve to illustrate the invention.

Example 1

A 500 c. c. (438 grams) portion of a light oil styrene fraction containing 33.3 grams of styrene per 100 c. c. of solution was treated with 10 c. c. of a 10% solution of sodium hydroxide in alcohol at a temperature of 20° C. during a period of 5 minutes. The mixture was allowed to stand for a period of 2 minutes, after which an additional 10 c. c. of the 10% solution of sodium hydroxide was added. The mixture was stirred for 5 minutes, then allowed to settle for 3 minutes. 400 c. c. of water then was added to the mixture, in several portions, removing the stratified water layer after each addition. The alkali and alkali residues were thus removed in the successive water layers.

The washing loss was 1.8% by weight, of the starting material.

The material was then dried over anhydrous sodium sulfate for a period of several hours. The drying loss was 3.7% of the total charging stock. The major portion of this loss was mechanical in nature.

The dried fraction then was distilled in vacuum, resulting in a further loss of 3.3% by weight of the charging stock.

The total loss amounted to 8.8% of the fraction originally charged to the unit. A considerable portion of this loss undoubtedly could be eliminated by large scale operations.

The color of the refined styrene fraction was 2.0 on the Gardner color scale, compared with a color of 2.5 for the starting material on the same scale.

A portion of the refined sample was polymerized for a period of 4 days at a temperature of 145° C. A resin yield of 32.4 grams per 100 c. c. was secured, indicating that 88.7% of the styrene in the fraction originally charged to the unit had been recovered.

An additional sample of the refined styrene was polymerized for a period of 10 days at 100° C. The resin secured had a color of 1.0 on the Gardner color scale. A similar resin prepared from the unrefined sample had a color of 2.0 on the same scale.

The resin prepared from the refined sample had a melting point of 161° C., whereas the melting point of the resin prepared from the unrefined sample was 154° C.

A portion of the refined resin was heated for a period of 2 days at a temperature of 145° C. in an atmosphere of nitrogen. The refined resin had a color of 7.0 on the Gardner scale at the end of this treatment. A sample of resin prepared from unrefined styrene had a color of 12.0 on the same scale after similar treatment.

While solutions of sodium hydroxide in alcohol of any desired strength may be employed, I prefer to use solutions of at least 5% strength, and up to say 90% strength. Solutions of higher or lower strength may be employed. For instance, solutions of lower strength may be used for purifying solutions of olefines and diolefines of higher concentration.

I find that caustic solutions of 10% to 60% concentration are very satisfactory, and that a solution of 25% concentration is excellent for all around purposes.

High concentrations lend themselves to conditions requiring more drastic treatment.

Although any suitable proportion of caustic solution may be employed, I prefer to use from 0.2% to 50% by volume based upon the material being treated.

I find that from 2% to 10% by volume of the material under treatment gives very satisfactory results.

While any suitable temperature may be employed during the various treating steps, I prefer to maintain the temperature between −40° C. and 75° C. In other words, 75° C. may be regarded as the upper limit which I find it generally preferable not to exceed.

Temperatures between approximately −10° C. and 40° C. are generally satisfactory.

In any event the temperature should decrease with increase in alkali concentration to avoid any considerable discoloration of the hydrocarbon due to the strength of the alkali. Permanent discoloration shows up after washing since washing usually removes most if not all of the temporary discoloration due to the treatment. Distillation, clay treating and/or other refining steps will remove the rest of the temporary discoloration. On the other hand, the temperature should not be so low as to render the alkali inactive.

Alcohols, in general, inorganic solvents or organic solvents or mixtures of the same may be used for dissolving the alkalies to be used in the refining process. Examples of such solvents are methyl alcohol, isopropyl alcohol, n-propyl alcohol, the butyl alcohols, the amyl alcohols, octyl alcohol, fusel oil, water, and liquid ammonia.

Either organic or inorganic alkalies, or any mixture of organic and/or inorganic alkalies may be used in the refining process. These may be used as such, or in the form of solutions in the above solvents.

Examples of inorganic alkalies which may be used are potassium hydroxide, sodium hydroxide, ammonia, calcium hydroxide, sodium carbonate, potassium carbonate, sodium bicarbonate, potassium bicarbonate, barium hydroxide, lithium hydroxide, magnesium hydroxide, barium carbonate, calcium carbonate, and magnesium carbonate.

Examples of organic alkalies which may be used are methyl amine, dimethyl amine, trimethyl amine, ethyl amine, diethyl amine, triethyl amine, tetraethyl ammonium hydroxide, trimethyl benzyl ammonium hydroxide; the aliphatic and aromatic amines in general; the aryl and alkyl substituted ammonium hydroxides in general; monoethanol amine, diethanol amine, triethanol amine, and the aryl or alkyl substituted compounds of this type.

Desirable results may also be secured by treating the hydrocarbon to be refined with undiluted alkali, which treatment may be either preceded or followed by treatment with an alkaline solution. For example, a methyl styrene fraction may be treated with an alcoholic solution of potassium hydroxide, the unchanged alkali and alkaline sludge removed, and the residual solution then treated with solid calcium hydroxide, followed by filtration or other suitable refining methods.

The organic amines are especially well suited for contacting the fraction to be purified without the addition of a solvent, because of their relatively good solubility in organic hydrocarbons. Water or other suitable solvent may be added to the mixture after the addition of the organic alkali if desired, in order to cause stratification to take place.

In place of this the organic alkali may be removed by the addition of a suitable absorbing agent, such as clay, activated clay, alumina, silica gel, fuller's earth, kieselguhr, diatomaceous earth, and the like, followed by filtration by suitable means.

A variation of this procedure is to filter the treated solution through a bed of the contact material.

These procedures also may be used when refining with inorganic alkalies, or mixtures of the same with organic alkalies, either in the undiluted state or in the form of solutions in solvents.

The alkaline treatment may be used alone or in conjunction with other methods of refining unsaturated hydrocarbons. Very good results are obtained by using the alkaline treatment in conjunction with an acid treatment.

This is particularly true when light oil unsaturated hydrocarbon fractions to be refined contain any considerable quantity of phenols. In such case a preceding alkaline treatment removes the phenols, thereby permitting a more drastic treatment with acid without danger of reacting the phenols with the unsaturated hydrocarbon.

On the other hand, the acid treatment may precede the alkaline treatment in which case the alkaline treatment may be relied upon, not only to further refine the material, but also to remove residual acid and acid residues therefrom.

Examples of acids and acid anhydrides which may be employed are (1) sulfuric acid, (2) any phosphoric acid, (3) any phosphorous acid, (4) $P_2O_5$, (5) $P_2O_3$, (6) sulfonic acids such as aromatic and naphthenic sulfonic acids, (7) organic acids, and (8) mixtures of two or more of the foregoing.

The foregoing acids are usually employed in solution form such as in water and in strengths say from 50% to 90%, although higher or lower strengths may be employed. Higher strengths are used for more drastic treatment, whereas lower strengths may be employed for relatively more purified materials. In any event, however, the acids such as the sulfuric acid and sulfonic acids are preferably free from uncombined sulfur dioxide and sulfur trioxide.

The quantities of acid employed and the temperature of treatment may be as already described in connection with the alkaline treatment although it will be understood that when an alkaline treatment and an acid treatment are both applied smaller quantities of each reagent will usually suffice.

Likewise, in those cases in which the acid reagent is soluble or partially soluble in the hydrocarbon, stratification may be obtained in the same manner as in the alkaline treatment, or removal of acid and acid residues may be accomplished by the other means set forth in connection with the alkaline treatment or otherwise as desired.

If desired, suitable additions may be made to the acid solution.

Examples of materials which might be added to the acid solution are (1) retarding agents, which have for their specific purpose the reduction of the effect of the acid upon the olefines, diolefines and aromatic hydrocarbons present in the fraction, such as boric acid and other compounds of boron; (2) oxidizing agents such as potassium permanganate, potassium dichromate, potassium chromate, sodium dichromate, sodium chromate, chromic acid, ferric oxide, lead oxide and the like; (3) reducing agents, the function of which is to remove highly reactive impurities by means of nascent hydrogen, such as zinc dust, iron filings, aluminum powder, magnesium powder, tin dust, nickel powder, and cadmium powder; and (4) inhibitors, the function of which is to inhibit the polymerization of the unsaturated hydrocarbons during the treating process, such as p-tertiary butyl catechol, 2-4 diaminophenol dihydrochloride, 2-amino-5 hydroxytoluene, p-benzyl aminophenol, and p-methyl aminophenol sulfate.

Any combination of (1), (2), (3) and (4) of the preceding paragraph may be employed, although usually (2) and (3) would not be combined since one tends to off-set the effect of the other.

An example of an alkaline treatment followed by an acid treatment is as follows:

*Example 2*

A 500 c. c. (438 grams) portion of a light oil styrene fraction containing 33.3 grams of styrene per 100 c. c. of solution was treated with 5 c. c. of a 10% solution of sodium hydroxide in alcohol at a temperature of 20° C. during a period of 5 minutes.

The mixture was allowed to stand for a period of 2 minutes after which an additional 5 c. c. of a 10% solution of sodium hydroxide was added.

The mixture was now stirred for 5 minutes and then allowed to settle for 3 minutes.

The alkali, alkali residues, and alcohol were now removed by washing successively with water, the water layer being removed after each washing. 400 c. c. of water was used for this purpose.

The styrene fraction was now agitated for 10 minutes with 10 c. c. of a 60% aqueous solution of sulfuric acid at a temperature of 20° C.

The mixture was then allowed to stand for 30 minutes during which time a sludge settled out and was removed.

An additional 10 c. c. of sulfuric acid solution was then added and the mixture again agitated for 10 minutes. A settling time of 30 minutes followed after which sludge was again removed.

The styrene fraction was then treated with 10 c. c. of a 20% aqueous solution of sodium hydroxide with stirring. After permitting the materials to settle the aqueous layer was removed.

The styrene fraction was now washed successively with water until the last washings were neutral to litmus which indicated complete removal of acid and alkaline residues.

The refined sample was now dried over anhydrous sodium sulfate.

As an example of an acid treatment followed by an alkaline treatment the first alkaline treatment in Example 2 might be omitted and the quantity of reagent, both acid and alkali, in each subsequent treatment increased from 10 c. c. to 25 c. c. Or the first alkaline treatment in Example 2 may be made to follow the acid treatment whereupon the second alkaline treatment is omitted.

The result in each instance was a highly refined styrene fraction.

What has been said with respect to styrene fractions also applies to other light oil fractions.

The addition of the alkali or alkaline solution to the hydrocarbon may be accompanied by the formation of emulsions if due precautions are not observed. These include (1) slow addition of the alkali or alkaline solution to the hydrocarbon material, (2) good control of temperature during the addition, and (3) slow but steady agitation. In addition, the addition of small quantities of certain materials to the alkali wash, such as liquid rosin, petroleum carboxylic acids, oleic acid, and naphthenic acids; and the addition of various emulsion inhibiting agents to the alkali wash such as aldehydes, will also serve to inhibit the formation of emulsions.

However, emulsions if formed can generally be broken by the addition of an absorbent material such as fuller's earth followed by filtering, or by the use of other suitable methods, such as electrical precipitation, the addition of various inorganic salts to the emulsion, and the like.

If desired, inert solvents such as petroleum naphtha and carbon tetrachloride may be added to the material under treatment either before or during the treating process.

Such materials are usually added to reduce the loss of olefines and diolefines present, although they may have other functions.

The crude fractions which may be treated by my process may have any reasonable boiling range.

For instance, crude styrene fractions may have a boiling range of from 125° C. to 165° C. or wider, although I prefer to use crude styrene fractions with boiling ranges which do not greatly exceed 140° C. to 150° C.

Excellent results are obtained when using crude styrene fractions with boiling ranges not exceeding 142° C. to 148° C.

What has just been said with respect to the boiling ranges of crude styrene fractions applies comparably to fractions of other unsaturated hydrocarbons.

For instance, a valuable methyl styrene fraction composed largely of para-methyl and meta-methyl styrenes is obtained from light oil when at least approximately 80% boils between 167° C. and 175° C. Likewise, a valuable indene fraction is obtained from light oil when at least approximately 80% boils between 177° C. and 186° C.

In general, and with all other conditions unchanged, the extent of purification will, generally speaking, be directly proportional to the narrowness in boiling range of the starting material.

Results comparable to those particularly set forth above in connection with styrene are obtained upon the polymerization of other light oil fractions such as methyl styrene and indene treated by my process.

As an example a purified methyl styrene fraction may be polymerized by subjecting it to a temperature of 80° C. for a period of 8 days, followed by removal of unpolymerized material by vacuum distillation. In a typical case the polymerized material had a color of 0.0 (water white) on the Gardner color scale.

Also as an example, a purified indene fraction may be polymerized by adding it to a suspension of 2.0% by weight of ferric chloride in toluene, followed by stirring for a period of three hours. The catalyst is then hydrolyzed by the addition of the theoretical amount of sodium hydroxide in the form of a 20% solution. The mixture then is filtered and the unpolymerized material removed by steam distillation. In a typical case the polymerized material had a color of 4.0 on the Gardner color scale.

The unwashed indene polymerized in a similar manner had a color of 8.0 on the Gardner color scale.

A crude styrene solution containing any quantity of styrene such as from 1.0% to 99% may be refined by my method.

Excellent results are obtained with styrene solutions containing from 10% to 80% styrene.

Comparable concentrations apply to the other unsaturated hydrocarbons refined by my method.

Further examples of such other unsaturated hydrocarbons are the other olefines and diolefines obtained from light oil, from drip oil (from gas mains), from coal tar, from cracked distillates, and from synthetic or other sources.

Contact between the material undergoing treatment and the treating material may be accomplished by any means known in the art.

For instance, any suitable batch, multiple batch, batch countercurrent, continuous countercurrent, or continuous concurrent contacting apparatus and method may be employed.

In certain cases it may be advisable to treat the unsaturated hydrocarbon, or fractions containing the unsaturated hydrocarbons, with successive portions of reagent in order to effect a more thorough purification of the hydrocarbon solution, or a more economical utilization of the reagent, or both. The batchwise addition of the reagent may be made with or without the removal of a portion or all of the reagent and/or sludge from the preceding application and with or without additional refining steps, such as neutralization, drying, fractionation, and/or crystallization between successive batchwise additions of the reagent.

In certain cases it may be found to be desirable to contact fresh charges of the unsaturated hydrocarbon fractions with spent reagent and/or sludge and residues from the preceding refining step in order to secure greater economy in the use of the reagent and/or a more thorough purification of the hydrocarbon fractions. The hydrocarbon fraction so treated may then be contacted with additional quantities of fresh reagent either with or without previously removing the sludge from the initial treatment and with or without additional refining steps, such as washing, neutralization, drying, fractionation and/or distillation, and the refining operation completed in the normal manner, namely by separation of the respective layers, followed by neutralizing, drying, and/or distilling.

The treated material, of course, lends itself to further purification, should this be desired. Such further purification may be by contact with clay, with activated carbon, or with diatomaceous earth at any suitable temperature, or by distillation at any desired pressure, or by washing processes, or by partial polymerization followed by removal of undesirable constituents, or by fractional crystallization, or by other physical or chemical means.

By operating my process more drastically it may be employed to completely remove the olefines and diolefines present in the material undergoing treatment leaving the aromatic hydrocarbons, naphthenes and/or paraffins unchanged. Special solvents may be prepared in this manner.

Other variations will become apparent to persons skilled in the art upon becoming familiar with this invention.

The treating process as outlined in the examples listed may be greatly simplified in most cases. For example, I find that styrene solutions may be refined in a satisfactory manner by treatment with alkali or alkaline solutions followed by the application of clay or activated carbon, either alone or in conjunction with other alkaline agents, such as sodium carbonate or lime, and the removal of all solid material from the treated solution by filtration or by other suitable means. No further treatment is usually necessary.

The term "permanent color" as used in the claims is intended to mean color which remains after the removal of reagent and reagent reaction products such as by neutralization and water washing followed by distillation.

It is, therefore, to be understood that the above examples are by way of illustration and that changes, omissions, additions, substitutions, and/or modifications might be made within the scope of the claims without departing from the spirit of the invention which is intended to be limited only as required by the prior art.

I claim:

1. A process for preparing a refined solution of a resin-forming unsaturated light oil hydrocarbon which is highly resistant to color formation when subjected to conditions for the polymerization of said unsaturated hydrocarbon which comprises subjecting light oil to fractional distillation to obtain a relatively close cut of said unsaturated hydrocarbon, treating said cut in the liquid phase with from 2% to 10% by volume of an alkaline reagent, said reagent being from 10% to 60% in alkali concentration, said treatment taking place at a temperature between —10° C. and 40° C. but sufficiently low to avoid adding any appreciable permanent color to said cut due to the strength of said alkaline reagent, and then removing residual alkali from said cut.

2. A process for preparing a refined styrene cut which comprises subjecting light oil to fractional distillation to obtain a cut the preponderant part of which boils between 142° C. and 148° C., treating said cut in the liquid phase with from 2% to 10% by volume of an alkaline reagent, said reagent being from 10% to 60% in alkali concentration, said treatment taking place at a temperature between —10° C. and 40° C. but sufficiently low to avoid adding any appreciable permanent color to said cut due to the strength of said alkaline reagent, and removing residual alkali from said styrene cut.

3. A process for preparing a refined methyl styrene cut which comprises subjecting light oil to fractional distillation to obtain a cut the preponderant part of which boils between 167° C. and 175° C., treating said cut in the liquid phase with from 2 to 10% by volume of an alkaline reagent, said reagent being from 10% to 60% in alkali concentration, said treatment taking place at a temperature between —10° C. and 40° C. but sufficiently low to avoid adding any appreciable permanent color to said cut due to the strength of said alkaline reagent, and removing residual alkali from said methyl styrene cut.

4. A process for preparing a refined indene cut which comprises subjecting light oil to fractional distillation to obtain a cut the preponderant part of which boils between 177° C. and 186° C., treating said cut in the liquid phase with from 2% to 10% by volume of an alkaline reagent, said reagent being from 10% to 60% in alkali concentration, said treatment taking place at a temperature between —10° C. and 40° C. but sufficiently low to avoid adding any appreciable permanent color to said cut due to the strength of said alkaline reagent, and removing residual alkali from said indene cut.

5. A process for preparing a refined cut of a resin-forming unsaturated light oil hydrocarbon which is highly resistant to color formation when subjected to conditions for polymerization of said unsaturated hydrocrabon which comprises subjecting light oil to fractional distillation to obtain a cut of said unsaturated hydrocarbon, treating said cut in the liquid phase with from 0.2% to 50% by volume of an alkaline reagent, said reagent being at least 5% in alkali concentration, said treatment taking place at a temperature below 75° C. and under conditions including alkali concentration and temperature sufficiently drastic to remove color-forming bodies but insufficiently drastic to polymerize a large part of said resin-forming unsaturated hydrocarbon and insufficiently drastic to add any appreciable permanent color to said cut, and removing said reagent from said cut.

6. A process for preparing a refined cut of a resin-forming unsaturated light oil hydrocarbon which comprises fractionating light oil to obtain a cut of said unsaturated hydrocarbon, contacting said cut in the liquid phase with an alkaline reagent at least 5% in alkali concentration, said contact of said cut and said reagent taking place at a temperature below 40° C. and under conditions including alkali concentration and temperature sufficiently drastic to remove color forming bodies but insufficiently drastic to polymerize a large part of said resin-forming unsaturated hydrocarbon and insufficiently drastic to add any appreciable permanent color to said cut, and removing said reagent from said cut.

7. A process for preparing a refined cut of a resin-forming unsaturated light oil hydrocarbon which comprises fractionating light oil to obtain a cut of said unsaturated hydrocarbon, contacting said cut in the liquid phase with an alkaline reagent at least 5% in alkali concentration, said contact of said cut and said reagent taking place at a temperature below 75° C. and under conditions including alkali concentration and temperature sufficiently drastic to remove color forming bodies but insufficiently drastic to polymerize a large part of said resin-forming unsaturated hydrocarbon and insufficiently drastic to add any appreciable permanent color to said cut, and removing said reagent from said cut.

FRANK J. SODAY.